(12) United States Patent
Kliebisch

(10) Patent No.: US 9,651,213 B2
(45) Date of Patent: May 16, 2017

(54) HEADLAMP FOR VEHICLES

(71) Applicant: Hella KGaA Hueck & Co., Lippstadt (DE)

(72) Inventor: Dirk Kliebisch, Paderborn (DE)

(73) Assignee: Hella KGaA Hueck & Co., Lippstadt (DE)

( * ) Notice: Subject to any disclaimer, the term of this patent is extended or adjusted under 35 U.S.C. 154(b) by 102 days.

(21) Appl. No.: 14/423,053

(22) PCT Filed: Sep. 3, 2013

(86) PCT No.: PCT/EP2013/068131
§ 371 (c)(1),
(2) Date: Feb. 20, 2015

(87) PCT Pub. No.: WO2014/037320
PCT Pub. Date: Mar. 13, 2014

(65) Prior Publication Data
US 2015/0260364 A1  Sep. 17, 2015

(30) Foreign Application Priority Data
Sep. 7, 2012 (DE) .......... 10 2012 108 309

(51) Int. Cl.
*F21S 8/10* (2006.01)
*B60Q 1/08* (2006.01)
*B60Q 1/14* (2006.01)

(52) U.S. Cl.
CPC .......... *F21S 48/1747* (2013.01); *B60Q 1/085* (2013.01); *B60Q 1/143* (2013.01);
(Continued)

(58) Field of Classification Search
CPC .. F21S 48/1747; F21S 48/115; F21S 48/1705; B60Q 1/085; B60Q 1/143;
(Continued)

(56) References Cited

U.S. PATENT DOCUMENTS

| 2008/0007961 A1* | 1/2008 | Mochizuki | B60Q 1/085 362/465 |
| 2010/0232173 A1* | 9/2010 | Ohno | F21S 2/005 362/538 |
| 2011/0235349 A1 | 9/2011 | Nakaya et al. | |

FOREIGN PATENT DOCUMENTS

| AT | 508604 A1 | 2/2011 |
| DE | 102005041234 A1 | 3/2007 |

(Continued)

*Primary Examiner* — Y M Lee
(74) *Attorney, Agent, or Firm* — Husch Blackwell LLP

(57) ABSTRACT

A headlamp for vehicles having numerous groups of LED light sources and having numerous optical units with different projection characteristics, such that a first light spot projected by a first optical unit is of a different size than a second light spot projected by a second optical unit, wherein a first subsidiary light distribution is formed by the first light spots, and a second subsidiary light distribution is formed by the second light spots, and the groups of LED light sources can be activated such that a predefined overall light distribution is formed by superimposing the subsidiary light distributions, wherein the optical units are designed such that all light spots have the same width, and the light spots projected by the various optical units have different heights.

9 Claims, 4 Drawing Sheets

(52) U.S. Cl.
CPC ......... *F21S 48/115* (2013.01); *F21S 48/1705* (2013.01); *B60Q 2200/30* (2013.01); *B60Q 2300/056* (2013.01); *B60Q 2300/41* (2013.01); *B60Q 2300/42* (2013.01); *B60Q 2300/45* (2013.01)

(58) Field of Classification Search
CPC ............ B60Q 2300/41; B60Q 2300/45; B60Q 2300/42; B60Q 2200/30
See application file for complete search history.

(56) References Cited

FOREIGN PATENT DOCUMENTS

| | | |
|---|---|---|
| DE | 102007052744 A1 | 5/2009 |
| DE | 102008047728 A1 | 3/2010 |
| DE | 102009020619 A1 | 11/2010 |
| EP | 2280215 A2 | 2/2011 |

\* cited by examiner

HEADLAMP FOR VEHICLES

CROSS REFERENCE

This application claims priority to PCT/EP2013/068131, filed Sep. 3, 2013, which itself claims priority to German Application No. 10 2012 108309.6, filed Sep. 7, 2012, which are both hereby incorporated by reference.

FIELD OF TECHNOLOGY

The invention relates to a headlamp for vehicles having numerous groups of LED light sources and having numerous optical units with different projection characteristics, such that first light spots projected by a first optical unit exhibit a different size than that of second light spots projected by a second optical unit, wherein a first subsidiary light distribution is formed by the first light spots, and a second subsidiary light distribution is formed by the second light spots, and wherein the groups of LED light sources can be activated such that a predefined overall light distribution is formed by superimposing the subsidiary light distributions.

BACKGROUND

A headlamp for vehicles is known from DE 10 2005 041 234 A1, with which an overall light distribution is formed by superimposing subsidiary light distributions. The subsidiary light distributions are each formed by means of numerous optical units having different projection characteristics, to each of which a different group of LED light sources is allocated. Each optical unit is designed such that lines and/or columns of light spots having the same size are projected therefrom onto a test screen. In order to be able to generate a predefined light distribution, such as an asymmetrical low beam light distribution, the light spots projected by a second optical unit are smaller than the light spots projected by the first optical unit. If a high beam light distribution is to be generated as the overall light distribution, in which the LED light sources are to be activated such that an object located in front of the vehicle is not blinded, an LED light source illuminating the segment of the region in front of the vehicle corresponding to the location of the object is switched off. Because the segment of the high beam light distribution is generated, in each case, by the projection of a single LED light source to form a light spot, the switching off of the LED light source to which the segment is allocated, leads to a large gradient in the luminosity between the segment that has been switched off and the illuminated segment. Dynamic light distributions, such as the displacement of the focal point of the light, can also only be used to a limited extent.

SUMMARY OF THE INVENTION

The object of the present invention is therefore to further develop a headlamp for vehicles, such that a variable adjustment of light distributions to the region in front of the vehicle that is to be illuminated is ensured, in particular with regard to traffic objects located in front of the vehicle.

According to the invention, the headlamp has optical units, which have a projection characteristic, such that all of the light spots projected therefrom have the same width in the horizontal direction on a test screen located at a distance thereto. However, the light spots projected by different optical elements are of different heights, such that segments of a region in front of a vehicle can be illuminated by superimposing numerous light spots. The result is an illumination of segments in front of the vehicle in columns, wherein, by switching on, or off, LED light sources, the light from which is projected via numerous optical units into the light spots for illuminating the same region in front of the vehicle, it is possible to vary the luminosity thereof. If it is possible by this means to dim the light striking an object located in front of the vehicle, in that the LED light sources corresponding thereto are shut off, the light spots of which are projected by means of the optical units onto the segment that is to be dimmed in which the traffic object is located, the segments adjacent to the segment in front of the vehicle that is to be dimmed can be illuminated to different extents, depending on how many and/or which optical units are active. The degree of illumination of the region in front of the vehicle in the high beam function can thus also be varied when there is a traffic object that is to be illuminated to a lesser extent. This is substantially achieved in that the optical units diffuse or collect the light differently exclusively in the direction of the columns.

According to a preferred embodiment of the invention, the optical units are designed such that they project, in each case, light spots of the same height from the group of LED light sources. Each optical unit thus forms light spots of the same height and same width, such that by superimposing light spots projected by different optical units, segments of the region in front of the vehicle can be illuminated with different luminosities.

The structure of the headlamp can be simplified when a single line of LED light sources is allocated to each of the optical units, such that each optical unit forms only a single line of light spots in the horizontal direction. By superimposing the corresponding light spots, individual segments of the region in front of the vehicle can thus be illuminated with different luminosities.

According to a further development of the invention, the LED light sources are designed such that they can be dimmed, so that a further varying of the luminosity of segments of the region in front of the vehicle is ensured.

According to a preferred embodiment of the invention, two or three optical units are provided for generating a high beam light distribution, to each of which one line of light sources is allocated. A high beam basic light distribution is obtained by the first optical unit, which diffuses the light generated by the LED light source in the vertical direction and serves, more or less, as a basic illumination of the region in front of the vehicle. At least one further optical unit is designed such that the light is projected into a forward region of the region in front of the vehicle. The light spots projected by this means are substantially lower than the height of the light spots for the high beam basic distribution.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
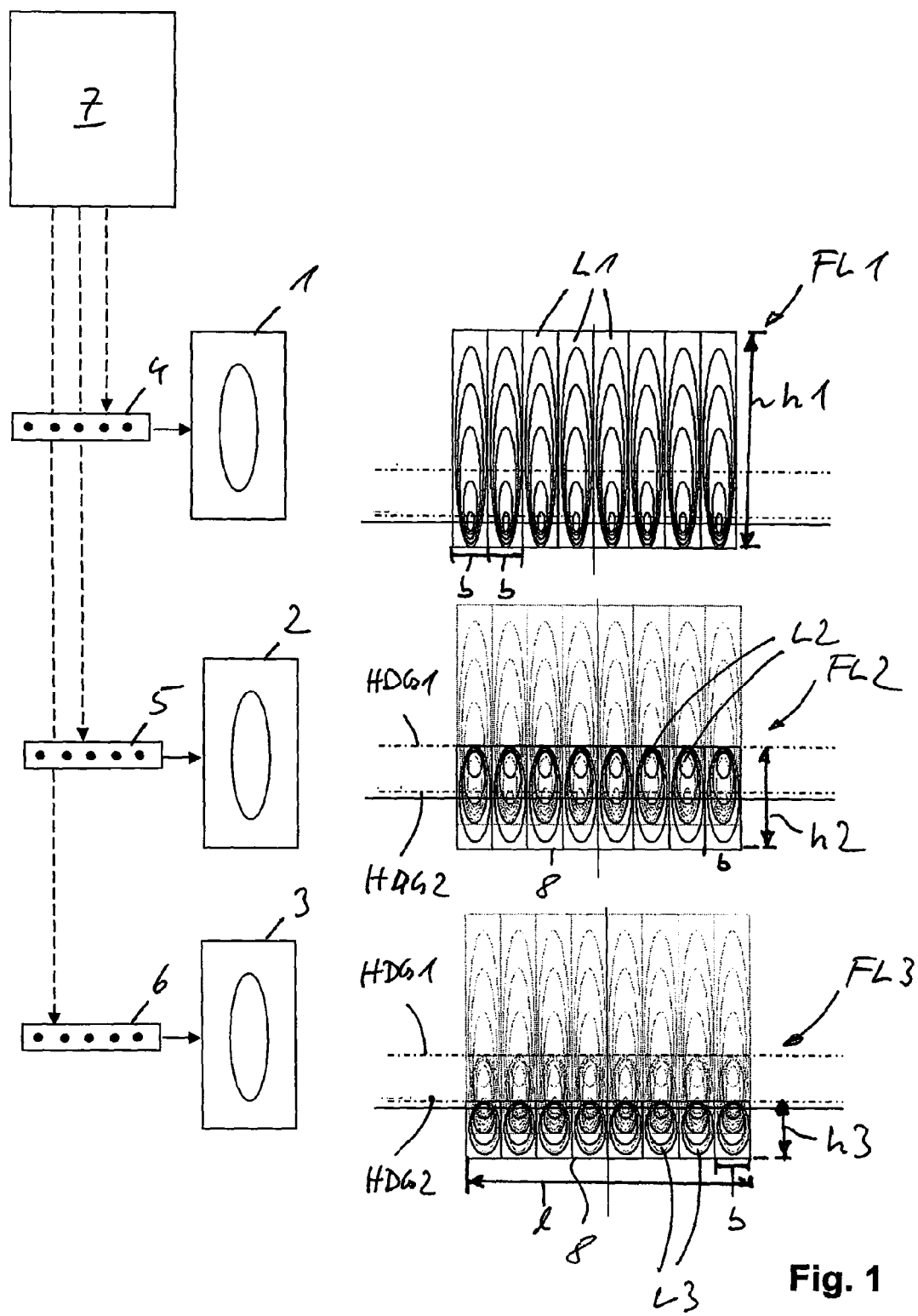
FIG. 1 is a schematic depiction of a light unit for generating a high beam light distribution with three optical units, to each of which one line of light sources is allocated, for forming a subsidiary light distribution.

A headlamp for vehicles has a light unit for generating a low beam light distribution and a light unit for generating a high beam light distribution.

The high beam light distribution has a first optical unit 1, a second optical unit 2 and a third optical unit 3, to each of which a group of Led light sources 4, or LED light sources 5, or LED light sources 6, respectively, are allocated. The groups 4, 5, 6 of LED light sources are each disposed in lines on a printed circuit board. They extend horizontally.

The groups 4, 5, 6 of LED light sources can be activated by a common activation unit 7, wherein not only entire lines 4, 5, 6 of the LED light sources, but also individual LED light sources of the lines 4, 5, 6 can be switched on and off, or can be dimmed The LED light sources can be designed, by way of example, as LED chips. The groups 4, 5, 6 of LED light sources can, for example, exhibit the same type of LED light sources.

The first optical unit 1 and the second optical unit 2 and the third optical unit 3 can consist, by way of example, of one or more lens elements.

The first optical unit 1 exhibits a projection characteristic such that a high beam basic light distribution FL1 can be generated, having a height h1 on a test screen at a distance thereto. The high beam basic light distribution FL1 consists of a line of light spots L1 that are designed such that they are diffused vertically. The individual light spots L1 have the same height h1 and an identical width b.

The second optical unit 2 has a projection characteristic such that a high beam light distribution FL2 having a height h2 is generated. If all of the LED light sources are switched on, the light spots L2 of the high beam light distribution FL2 form an upper light/dark border HDG1. The individual light spots L2 have a height h2 that is lower than the height h1 of the light spots L1 in the high beam basic light distribution FL1. The light spots L2 of the second high beam light distribution FL2 have the same width b as the light spots L1 of the high beam light distribution FL1.

The third optical unit 3 has a projection characteristic such that the light of the LED light sources 6 forms a high beam light distribution FL3 having a height h3. An upper edge of the projected light spots L3 forms a lower light/dark border HDG2, disposed at a spacing beneath the first light/dark border HDG1. The light spots L3 of the third high beam light distribution FL3 thus have a lower height h3 than the heights h1, h2 of the light spots L1 and L2 respectively. The light spots L3 have the same width b as the light spots L1 and L2.

The high beam light distributions FL1, FL2 and FL3 each form a subsidiary light distribution, which can be superimposed to generate an overall light distribution. Because the light spots L1, L2, L3 of all of the high beam light distributions FL1, FL2, FL3 have the same width b, the subsidiary light distributions can be superimposed in columns, i.e. vertically.

The optical units 2, 3 are designed such that the light distributions FL2, FL3, or the light spots L2, L3, respectively, extend vertically upward from a common reference horizontal 8.

The light spots L1, L2, L3 of the respective subsidiary light distributions FL1, FL2, FL3 each extend in a single, horizontal line. The number of light sources L1, L2, L3 in the respective high beam light distributions FL1, FL2, or FL3 are identical; in the present embodiment example, the number is eight. In this respect, the high beam light distributions FL1, FL2, FL3 also have an identical overall width 1 (horizontal extension).

In order to generate a high beam function, the LED light sources can be activated by means of the activation unit 7 such that the first high beam light distribution FL1 and/or the second high beam light distribution FL2 and/or the third high beam light distribution FL3 are/is generated. Because the LED light sources can be activated individually, a dynamic dimming of an object located in front of the vehicle can be implemented.

Figure 2:
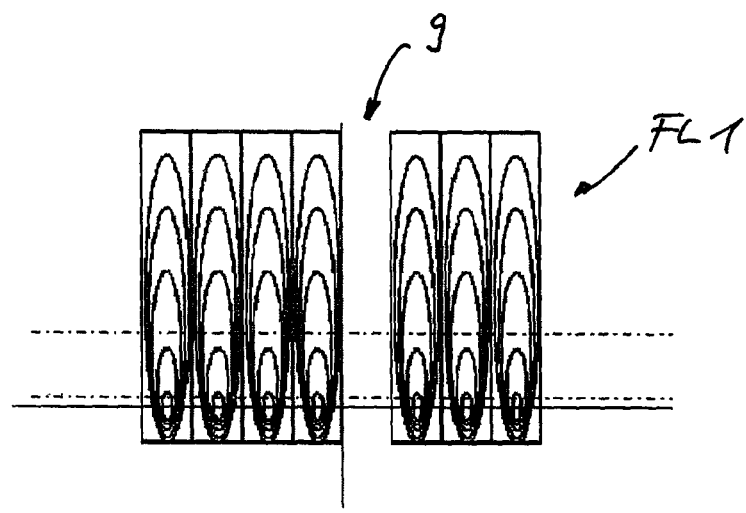
FIG. 2 is a first high beam light distribution, which is generated by projecting light spots by means of a first optical unit, wherein a one column segment of the high beam light distribution is dimmed.

According to a first embodiment in accordance with FIG. 2, only the group 4 of LED light sources, allocated to the first optical unit 1, is activated, wherein, depending on the determination of the location of the traffic object in front of the vehicle, an LED light source in group 4 of LED light sources is switched off, this being the one that projects the light spots L1 by means of the first optical unit 1, when switched on, in which the traffic object is currently located. By this means, a dimmed column 9 is created.

Figure 3:
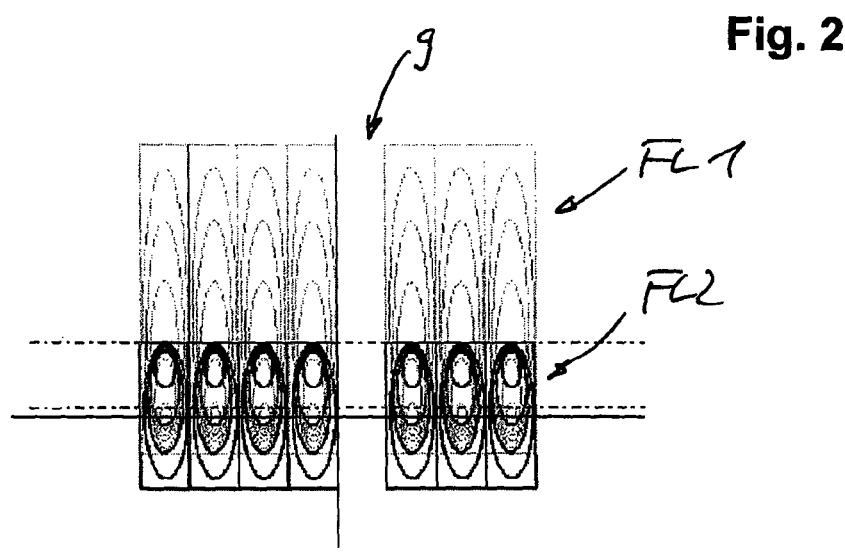
FIG. 3 is a second high beam light distribution, generated by projecting light spots by means of the first optical unit and a second optical unit, wherein a column segment of the high beam light distribution is dimmed.

According to an alternative embodiment of the invention in accordance with FIG. 3, this dimmed column 9 is also created when the groups 4, 5 of LED light sources allocated to the first optical unit 1 and the second optical unit 2 are activated. In accordance with the variant according to FIG. 2, not only the LED light sources of the first group 4 that would otherwise illuminate the traffic object are switched off, but also those in the second group 5.

Figure 4:
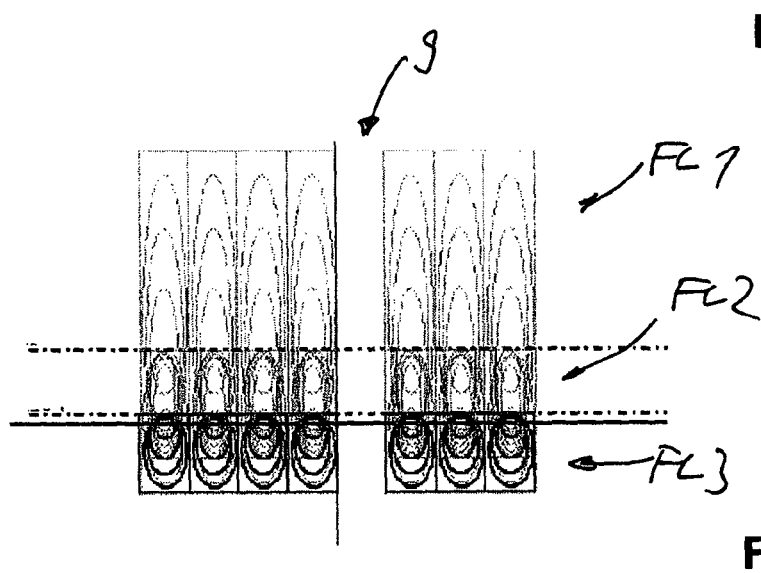
FIG. 4 is a third high beam light distribution, generated by projecting light spots by means of the first optical unit, the second optical unit, and a third optical unit, wherein a column segment of the high beam light distribution is dimmed.

In accordance with an embodiment according to FIG. 4, the dimmed column 9 can also be created when the LED light sources allocated to the three optical units 1, 2, 3 are switched on, with the exception of those, by means of which the traffic object would be illuminated.

Figure 5:
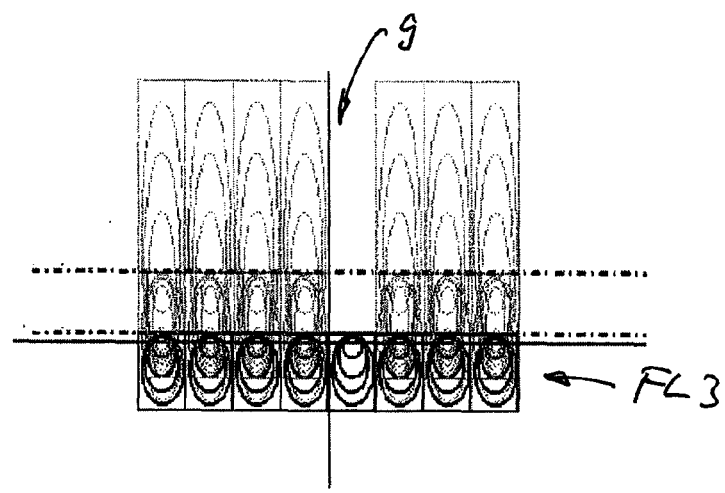
FIG. 5 is a high beam distribution, in which, in contrast to FIG. 4, all of the LED light sources allocated to the third optical unit are projected, in order to raise the level of the illumination.

According to another embodiment of the invention in accordance with FIG. 5, in differing from the embodiment according to FIG. 4, the dynamic high beam function can also be designed with an integrated dimming, such that, fundamentally, all LED light sources in the third high beam light distribution FL3 remain switched on. As a result, the dimmed column 9 is raised vertically.

Figure 6:
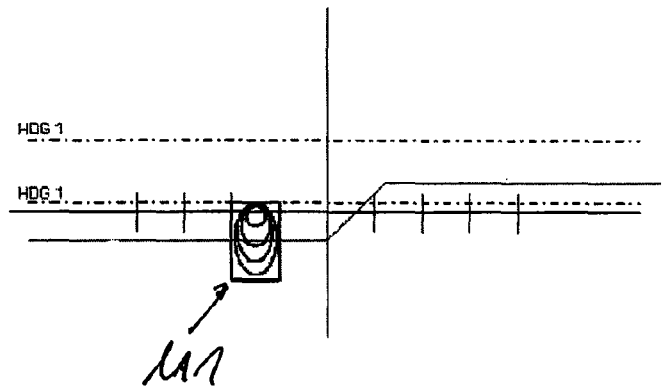
FIG. 6 is an activation of only one of the LED light sources allocated to the third optical unit, in order to generate a marker light in addition to a low beam light distribution.
Figure 7:
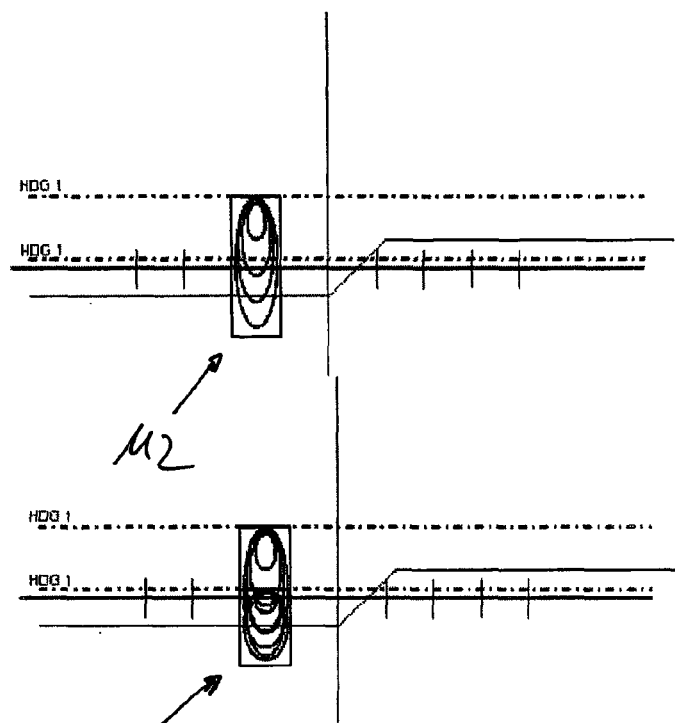
FIG. 7 is an activation of only one of the LED light sources allocated to the second optical unit, in order to generate a marker light in addition to low beam light distribution.
Figure 8:
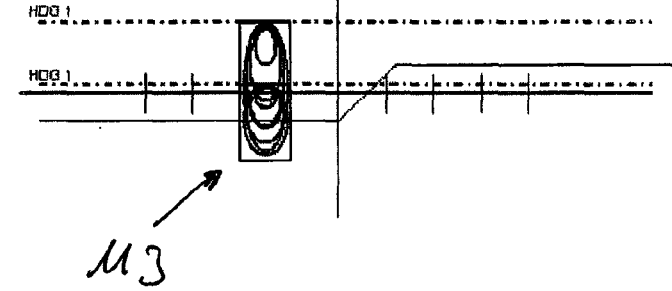
FIG. 8 is an activation of only one of the LED light sources allocated to the second and third optical units, in order to generate the marker light in addition to a low beam light distribution.

According to another embodiment in accordance with FIGS. 6, 7, and 8, the segmented column activation of the high beam light distributions FL1, FL2, FL3 can also be used for generating a marker light in addition to an existing low beam. According to FIG. 6, only one single LED light source in the row 6 of LED light sources allocated to the third optical unit 3 is switched on, in order to form a marker spot M1. According to FIG. 7, only one single LED light source of the row 4 of LED light sources allocated to the second optical unit 2 is switched on, in order to form a marker spot M2. The marker spots M1 and M2 are superimposed, in accordance with FIG. 8, to form a marker light spot M3, wherein the corresponding LED light sources in the second and third groups 5, 6 are switched on.

Figure 9:
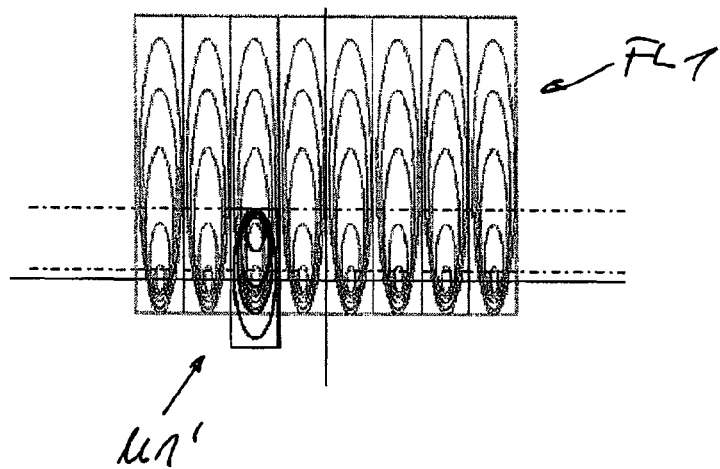
FIG. 9 is an activation of only one of the LED light sources allocated to the second optical unit in order to generate a marker light in addition to a basic high beam light distribution generated by the first optical unit.
Figure 10:
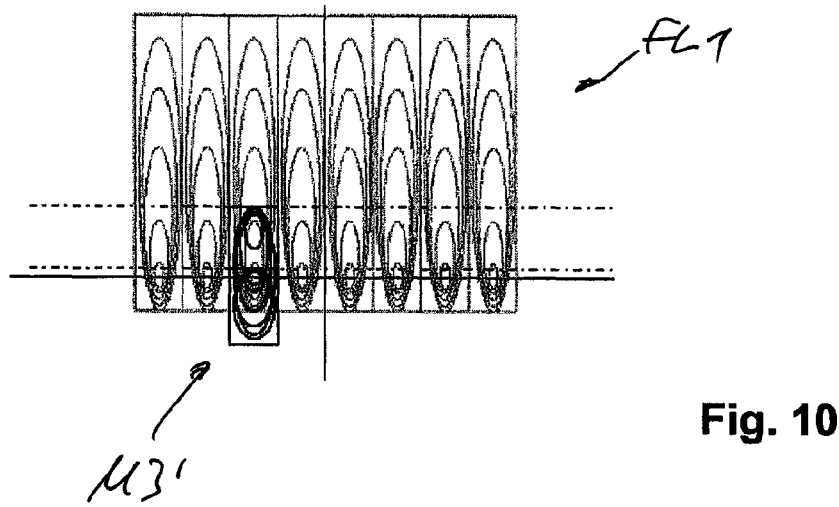
FIG. 10 is an activation of only one of the LED light sources allocated to the second and third optical units, in order to generate a marker light in addition to a high beam basic light distribution generated by the first optical unit.
Figure 11:
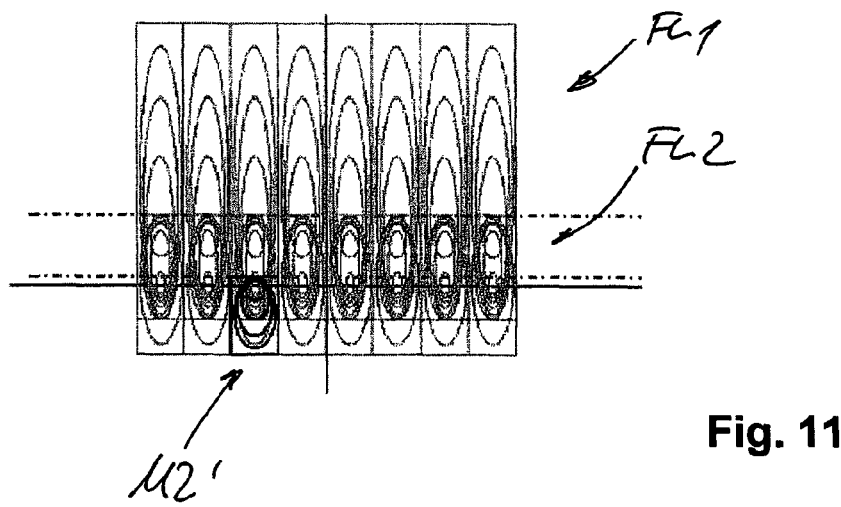
FIG. 11 is an activation of only one of the LED light sources allocated to the third optical unit, in order to generate a marker light in addition to a high beam basic light distribution generated by the first and second optical units.

In accordance with the embodiment examples according to FIGS. 9 to 11, a marker light function can be implemented in addition to a high beam light function.

In accordance with FIG. 9, the high beam is provided by the activated LED light sources in the first group 4 for generating the high beam light distribution FL1. In order to generate the marker light, an LED light source of the group 5 of LED light sources allocated to the second optical unit 2 is switched on, in order to generate the marker spot M1'.

According to another alternative embodiment in accordance with FIG. 11, the high beam function can also be generated by fully activating groups 4 and 5 of the LED light sources. The marker light is created by additionally switching on one of the LED light sources in group 6, in order to generate a marker light spot M2'.

In accordance with an alternative embodiment according to FIG. 10, the marker light can also be generated by superimposing the marker light spots M1' and the marker light spots M2' to form a marker light M3'. The high beam function is generated thereby—as is the case with the embodiment according to FIG. 9—by fully activating the group 4 of LED light sources.

According to a not shown, alternative embodiment, the groups of LED light sources can also be formed by numerous lines of LED light sources.

LIST OF REFERENCE SYMBOLS

1 optical unit
2 optical unit
3 optical unit
4 group of LED light sources
5 group of LED light sources
6 group of LED light sources
7 activation unit
8 reference horizontal axis
9 dimmed column
b width
FL1, FL2, FL3 high beam light distribution
h1, h2, h3 height
HDG1, HDG2 light/dark border
1 overall width
L1, L2, L3 light spots
M1, M2, M3; marker light spots
M1', M2', M3'

The invention claimed is:

1. A headlamp for vehicles comprising:
a plurality of groups of LED light sources;
a plurality of optical units with different projection characteristics, such that a first light spot projected by a first optical unit has a different size than a second light spot projected by a second optical unit, and the second light sport has a different size than a third light spot projected by a third optical unit,
wherein a first subsidiary light distribution is formed by the first light spot, a second subsidiary light distribution is formed by the second light spot, and a third subsidiary light distribution is formed by the third optical unit,
wherein the groups of LED light sources can be activated such that a predefined overall light distribution is formed by superimposing respective subsidiary light distributions of each respective light spot formed by each respective group of LED light sources,
wherein the optical units are designed such that all light spots have the same width and in that the light spots formed by the different optical units have different heights, and
wherein the height of the light spots generated by the second optical unit has an upper light/dark border, and the height of the light spots generated by the third optical unit has an upper light/dark border below the upper light/dark border of the light sports generated by the second optical unit.

2. The headlamp according to claim 1, wherein the light spots projected by the same optical units each exhibit the same height.

3. The headlamp according to claim 1 wherein the respective light spots projected by the optical units extend in a single line, horizontally.

4. The headlamp according to claim 1 wherein the projection characteristic of the optical units, is designed such that the projected lines of light spots exhibit the same horizontal extension.

5. The headlamp according to claim 1 wherein the LED light sources are designed such that they can be dimmed.

6. The headlamp according to claim 1 wherein, in order to form a high beam light distribution, the first optical unit is provided with associated LED light sources, by means of which the light spots having a height can be generated, in order to form a high beam basic light distribution, and in that, additionally, the second and third optical units, each having LED light sources allocated to them, are provided, by means of which light spots can be generated, having a height that is less than the height of the light spots in the high beam basic light distribution.

7. The headlamp according to claim 1 wherein an activation unit is provided, such that, depending on the determination of the location of an object in front of the vehicle, those LED light sources can be shut off that are projected by the various optical units in order to form a vertical dimmed column of light spots in which the object is located.

8. The headlamp according to claim 1 wherein an activation unit is provided such that, depending on the determination of a location of an object in front of the vehicle, those LED light sources can be shut off that are projected by various optical units in order to form a vertical dimmed column of light spots in which the object is located, wherein one of a lowest light spots in the vertical dimmed column of light spots cannot be switched off.

9. The headlamp according to claim 1 wherein an activation unit is provided such that, depending on the determination of a location of an object in front of the vehicle, those LED light sources can be switched on that are projected, in addition to a low beam light distribution, or in addition to a high beam basic light distribution, by at least one optical unit to form light spots in a vertical column in which the object is located.

* * * * *